(12) United States Patent
Williamson et al.

(10) Patent No.: US 10,119,064 B2
(45) Date of Patent: Nov. 6, 2018

(54) THERMALLY UNSTABLE AMMONIUM CARBOXYLATES FOR ENHANCED OIL RECOVERY

(71) Applicant: Dow Global Technologies LLC, Midland, MI (US)

(72) Inventors: Alexander Williamson, Rosharon, TX (US); Timothy J. Young, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/328,557

(22) PCT Filed: Sep. 8, 2015

(86) PCT No.: PCT/US2015/048787
§ 371 (c)(1),
(2) Date: Jan. 24, 2017

(87) PCT Pub. No.: WO2016/048637
PCT Pub. Date: Mar. 31, 2016

(65) Prior Publication Data
US 2017/0210972 A1    Jul. 27, 2017

Related U.S. Application Data

(60) Provisional application No. 62/053,446, filed on Sep. 22, 2014.

(51) Int. Cl.
*C09K 8/592* (2006.01)
*C09K 8/584* (2006.01)
*E21B 43/00* (2006.01)
*E21B 43/24* (2006.01)

(52) U.S. Cl.
CPC .............. *C09K 8/592* (2013.01); *C09K 8/584* (2013.01); *E21B 43/00* (2013.01); *E21B 43/2408* (2013.01)

(58) Field of Classification Search
CPC ..... E21B 43/2408; E21B 43/00; C09K 8/584; C09K 8/592
See application file for complete search history.

(56) References Cited

U.S. PATENT DOCUMENTS

| | | |
|---|---|---|
| 6,230,814 B1 | 5/2001 | Nasr et al. |
| 2008/0139418 A1 | 6/2008 | Cioletti et al. |
| 2014/0045732 A1* | 2/2014 | Mazyar .................. C09K 8/58 507/242 |

* cited by examiner

Primary Examiner — Catherine Loikith

(57) ABSTRACT

A process comprising the steps of: (a) injecting a steam composition into a subterranean location containing heavy hydrocarbons, preferably bitumen, wherein the steam composition comprises (i) steam and (ii) an ammonium carboxylate and (b) recovering the heavy hydrocarbon from the subterranean location to above the ground. The process is preferably a cyclic steam stimulation (CSS) process, a steam assisted gravity drainage (SAGD), or a combination thereof.

7 Claims, 1 Drawing Sheet

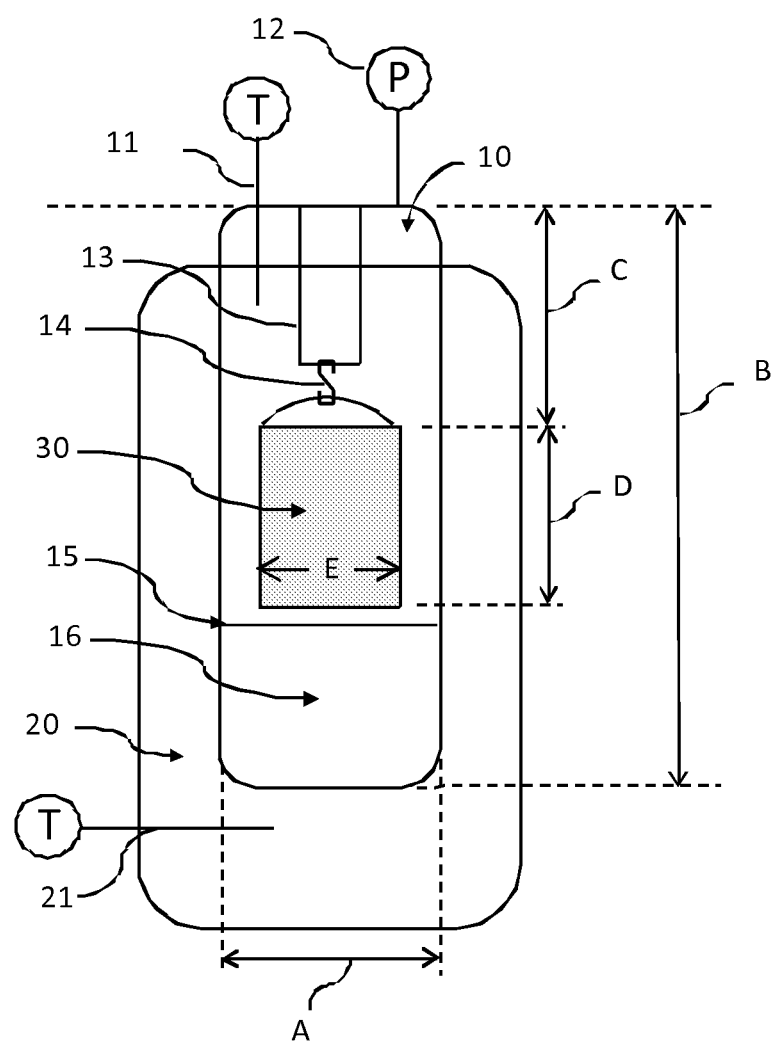

THERMALLY UNSTABLE AMMONIUM CARBOXYLATES FOR ENHANCED OIL RECOVERY

FIELD OF THE INVENTION

The present invention relates to a steam composition useful for an in situ steam extraction method of removing heavy hydrocarbons, preferably bitumen, from underground locations. Said steam composition comprises steam and an ammonium carboxylate.

BACKGROUND OF THE INVENTION

Bitumen recovery from oil sands is a challenging activity that requires accessing subterranean bitumen, extracting the bitumen from the subterranean sand and then recovering the bitumen from the subterranean location to above ground. There are numerous proposed methods for recovering bitumen from oil sands. The Background section of US2008/0139418 provides a review of many recovery methods including strip mining, cold flow technique, cyclic steam stimulation (CSS), steam assisted gravity drainage (SAGD) and vapor extraction process (VAPEX).

Strip mining removes bitumen together with sand from underground and then extracts bitumen from the sand while above the ground. Strip mining is not an in situ extraction method because it involves extracting bitumen from sand after removing the sand from the ground. In situ extraction of bitumen involves extracting bitumen from sand in its natural location underground. In situ extraction is more desirable than strip mining because it is less damaging to the landscape than strip mining.

The cold flow technique is only useful for recovering oils that have low enough viscosity to pump at reservoir conditions. Bitumen is too viscous in most subterranean oil sand deposits to allow the cold flow technique to be a reasonable method for recovering bitumen from oil sands.

VAPEX is a method that requires injecting hydrocarbon solvents into a first horizontal well that extends into subterranean oil sands. The solvents penetrate into the oil sands, reduce the viscosity of bitumen by dilution and enable the bitumen/solvent mixture to drain into a second horizontal well below the first from which recovery of the bitumen/solvent mixture occurs. Desirably, hydrocarbon solvent is removed from the bitumen above ground and desirably recycled. The VAPEX method is a "cold" process, which means the material injected into the well is not heated any appreciable amount as opposed to "hot" processes (commonly known as, thermal methods) such as CSS and SAGD where steam is injected into a well. Cold processes such as the VAPEX method are less efficient at extracting bitumen than hot processes such as CSS and SAGD processes because bitumen viscosity is higher at lower temperatures. Therefore, to be effective, the VAPEX method requires injection of large amounts of hydrocarbon solvents into the well in order to sufficiently dilute the bitumen to achieve drainage.

Use of hydrocarbon solvents, particularly high concentrations of hydrocarbon solvents, can be undesirable in in situ bitumen recovery processes. Hydrocarbons can cause asphaltenes to precipitate from bitumen and the precipitated asphaltenes can undesirably reduce the reservoir permeability. Additionally, hydrocarbon solvent can be lost into the surrounding subterranean environment, which can result in environmental contamination concerns and increased processing costs. Use of large amounts of hydrocarbon solvents, necessary for suitable solvating of bitumen, also requires and extra process step to recover the hydrocarbon from the bitumen upon extraction of the bitumen. Therefore, it is desirable to avoid both "cold" process methods and the use of hydrocarbons during in-situ bitumen recovery.

CSS and SAGD processes are "hot" processes (that is, thermal methods) that use hot steam to decrease the viscosity of subterranean bitumen. In these processes steam is injected down a first well into subterranean oil sands. The steam penetrates the sands and lowers the viscosity of bitumen by heating the oil sands, which facilitates flow of the bitumen through the sands into either the first well (CSS) or to a second well (SAGD) from which recovery of the bitumen occurs. With the CSS method, steam is injected into a well at temperatures of 250° C.-400° C. The well then sits for days or weeks during which time the steam heats bitumen in the subterranean environment around the well causing bitumen to drain into the well and after which hot oil mixed with condensed steam is pumped out from the well for weeks or months. Then the process is repeated. In the SAGD process two horizontal wells are drilled, one below the other (generally approximately five meters apart). Steam is injected into the upper well, heating bitumen in the surrounding subterranean environment thereby lowering the viscosity of the bitumen causing it to flow into the lower well. The resulting bitumen and condensed steam mixture is subsequently pumped to the surface from the bottom well. According to US2008/0139418, recovery of bitumen from an oil sands reservoir by CSS is typically only about 20-25 percent (%) while recovery in SAGD processes is reportedly up to about 60% of the available bitumen in the oil sands reservoir.

Typically, steam alone (without additives) is used for oil recovery in SAGD. The latent heat of condensation at the steam chamber edges lowers the viscosity of the bitumen sufficiently to allow gravity drainage. This process is however, slow and steam to oil ratios (SOR) of about 3:1 are typically needed. It is thought that an additive that enhances the formation of oil-in-water emulsions would enhance the rate of drainage through the porous chamber (due to smaller emulsion droplets) and perhaps allow less water usage by decreasing the SOR.

A modified version of the SAGD process is also known. U.S. Pat. No. 6,230,814 describes what has become known as the expanding solvent steam assisted gravity drainage (ES-SAGD) process. The ES-SAGD process requires combining hydrocarbons with steam in a SAGD-type process so the hydrocarbons can solubilize bitumen in subterranean oil sands to further reduce bitumen viscosity to facilitate the drainage of bitumen into a second well hole for recovery to above ground. The reference identifies suitable additives as hydrocarbons having from one to 25 carbons. However, as explained above, it is desirable to avoid injecting hydrocarbons into a well in order to facilitate removal of bitumen.

Conventional alkaline enhanced oil recovery agents such as NaOH, $NaHCO_3$ or $Na_2CO_3$ are not volatile, and thus do not reach steam chamber edges (even though they could in theory be carried to the bottom of the chamber by dissolving in residual hot water in the Injector Well).

It is desirable to identify an in situ (that is, subterranean) method for recovering heavy hydrocarbons, such as bitumen from oil sands, that does not require injecting hydrocarbons into subterranean oil sands but that offers a greater recovery percentage than current CSS and SAGD processes.

BRIEF SUMMARY OF THE INVENTION

The present invention offers an in situ heavy hydrocarbon, i.e., bitumen, recovery process using steam that provides a solution to the problem of increasing heavy hydrocarbon recovery percentages relative to current CSS and SAGD processes.

In one embodiment, the present invention is a process comprising: (a) injecting a steam composition into a subterranean location containing heavy hydrocarbons, preferably bitumen, the steam composition comprising (i) steam and (ii) an ammonium carboxylate, preferably in a concentration between 0.005 weight percent or more and 25 weight percent or less, more preferably between 0.005 weight percent or more and 5 weight percent or less based on combined ammonium carboxylate and steam weight, said ammonium carboxylate having the following chemical formula:

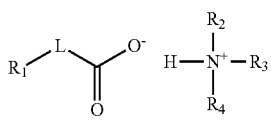

wherein L represents a methylene group, an alkyl ether group, preferably —CH$_2$CH$_2$CH$_2$O—, —CHMeCH$_2$O—, or —CH$_2$CHMeO—, an aryl group, an aryloxy group preferably —C$_6$H$_4$O—, an alkyl aryl group preferably —CH$_2$C$_6$H$_4$—, or alkyl aryloxy group preferably —CH$_2$C$_6$H$_4$O—, in some embodiments, the L group may be substituted with alkyl groups, branched alkyl groups, or heteroatom containing groups such as hydroxyl, acetoxy, alkyl ether, or halogen, R$_1$ is hydrogen or a linear or branched alkyl group having a primary chain length equal to or greater than 1 carbon and equal to or less than 15 carbons, preferably equal to or greater than 3 carbons and equal to or less than less than 15 carbons, and R$_2$, R$_3$, and R$_4$ are independently a hydrogen, a linear alkyl group, or a branched alkyl group and (b) recovering the heavy hydrocarbon from the subterranean location to above the ground.

In a preferred embodiment of the process of the present invention disclosed herein above, the ammonium carboxylate is any combination of one or more of the ammonium ions (i) listed hereinbelow with one or more of the carboxylate ions (ii) listed herein below: preferably the ammonium ion (i) is selected from: ammonium (NH$_4^+$), methylammonium, dimethylammonium, trimethylammonium, ethylammonium, diethylammonium, triethylammonium, methylethylammonium, dimethylethylammonium, diethylmethylammonium, propylammonium, dipropylammonium, tripropylammonium, butylammonium, dibutylammonium, tributylammonium, pentylammonium, dipentylammonium, hexylammonium, dihexylammonium, heptylammonium, octylammonium, nonylammonium, decylammonium, undecylammonium, 1,1-dimethyl-2-hydroxy-ethylammonium, or dodecylammonium and preferably the carboxylate ion (ii) is selected from: acetate, propionate, butanoate, 2-methylpropionate, pentanoate, 2-methylbutanoate, 3-methylbutanoate, 2,2-dimethylpropionate, hexanoate, 2-methylpentanoate, 3-methylpentanoate, 4-methylpentanoate, 3,3-dimethylbutanoate, heptanoate, 2-methyl hexanoate, octanoate, 2-ethylhexanoate, 2-methylheptanoate, 2-propylpentanoate, nonanoate, decanoate, undecanoate, dodecanoate, benzoate, phenylacetate, or methylbenzoate.

In one embodiment of the process of the present invention disclosed herein above the carboxylate ion in the form of its free carboxylic acid (i.e., in its acid form) has a boiling point of equal to or less than 300° C. at ambient pressure and the ammonium ion in the form of its free amine has a boiling point of equal to or less than 300° C. at ambient pressure.

In one embodiment of the process of the present invention disclosed herein above, the process is cyclic steam stimulation (CSS) process where the recovered heavy hydrocarbon is pumped up the same well that the steam composition is injected down.

In another embodiment of the process of the present invention disclosed herein above, the process is a steam assisted gravity drainage (SAGD) process and the steam composition is injected into the ground through a first well and the heavy hydrocarbon that is displaced from the ground is recovered to above ground through a second well.

BRIEF DESCRIPTION OF THE DRAWINGS

FIG. 1 provides an illustration of a vessel used to determine bitumen extraction efficiency in Experiment.

DETAILED DESCRIPTION OF THE INVENTION

In one embodiment, the present invention is a method for producing a heavy hydrocarbon. For the purposes of this application, a heavy hydrocarbon includes dense or high viscosity crude oils and bitumen.

Heavy hydrocarbons can be difficult to produce. These hydrocarbons are very viscous and often cannot be produced using oil wells that are powered only by formation pressures. One method of lowering the viscosity of heavy hydrocarbons in subterranean formations is to flood the formation with steam. Steam increases the temperature of the hydrocarbons in the formation, which lowers their viscosity, allowing them to drain or be swept towards an oil well and be produced. Steam can also condense into water, which can then act as a low viscosity carrier phase for an emulsion of oil, thereby allowing heavy hydrocarbons to be more easily produced.

In one embodiment, the invention is a method of recovering heavy hydrocarbons using an oil well. In this embodiment, the hydrocarbon in a subterranean formation is contacted with an admixture of steam and an ammonium carboxylate, a primary ammonium carboxylate, a secondary ammonium carboxylate, a tertiary ammonium carboxylates, or mixtures thereof. The ammonium carboxylate compound of the present invention comprises an ammonium ion derived from its free amine and a carboxylate ion derived from a carboxylic acid (i.e., in its free acid form). The steam and thermally unstable ammonia carboxylate admixture is introduced downhole using either the same well used for production or other wells used to introduce the steam into the formation. Either way, the steam condenses and forms an aqueous phase which can help liberate the heavy hydrocarbon from the mineral and carry it towards the production well.

In another embodiment, the invention is a method of recovering heavy hydrocarbons, especially bitumen, where the heavy hydrocarbon is recovered from a hydrocarbon bearing ore. One such ore is the bitumen rich ore commonly known as oil sand(s) or tar sand(s).

Enormous hydrocarbon reserves exist in the form of oil sands. The asphalt-like glassy bitumen found therein is often more difficult to produce than more liquid forms of underground hydrocarbons. Oilsand bitumen does not flow out of the ground in primary production. Such ore may be mined in open pits, the bitumen separated from the mineral ex situ using at least warm water, sometimes heated with steam, in giant vessels on the surface. Or the ore can be heated with steam in situ, and the bitumen separated from the formation matrix while still underground with the water condensed from the steam.

Unlike conventional heavy crude oils, the bitumen in oilsands is not continuous but in discrete bits intimately mixed with silt or capsules encasing individual grains of water wet sand. These bituminous hydrocarbons are considerably more viscous than even conventional heavy crude oils and there is typically even less of it in the formation-even rich oilsand ores bear only 10 to 15 percent hydrocarbon.

One method of recovering such bitumen is to clear the earthen overburden, scoop up the ore from the open pit mine, and then use heated water to wash away the sand and silt ex situ, in a series of arduous separation steps.

A more recent process separates the hydrocarbons from the sand in situ using horizontal well pairs drilled into the deeper oilsand formations. High pressure, 500° C., dry steam is injected into an upper (injector) well, which extends lengthwise through the upper part of the oilsand deposit. The steam condenses, releasing its latent and sensible heat which melts and fluidizes the bitumen near the injector well. As the oil and water, now at about 130 to about 230° C., drains, a dry steam chamber forms above the drainage zone.

One disadvantage to this method of hydrocarbon production is that new steam, along with any additives that it may include, may have to travel ever longer distances through this porous sand and clay to reach the progressing interface between the dry steam chamber and the zone where the oil and water drainage commences (a production front). This process is known as steam assisted gravity drainage and is commonly referred to by its acronym, "SAGD".

Unlike a conventional steam drive, the pressure of the steam is not primarily used to push the oil to the producer well; rather, the latent heat of the steam is used to reduce the viscosity of the bitumen so that it drains, along with the water condensed from the steam, to the lower, producer well by gravity. Since, at the production temperature of about 150° C., pure water is about 300 times less viscous than pure bitumen, and the typically water-wet formation can't hydrophobically impede the flow of water, the water drains much faster through the formation than the melted bitumen.

In a typical SAGD start-up, water is the first thing out of the ground. The concentration of hydrocarbon in the production fluid increases with time until eventually the oil concentration levels out at about 25 to 35 percent of the produced fluid. Thus the limiting "steam to oil ratio" or SOR is about 2 to 3.

Whatever the condition of the fluids underground, what reaches the first phase separator on the surface may not be two bulk phases, that is, an oil-based emulsion and a water-based emulsion. Instead, the predominant emulsion is usually oil-in-water. This emulsion typically carries with it is the most bitumen it can carry without flipping states, or inverting, into a water-in-oil emulsion.

In practice then, the SOR, and thus the oil production rate, may be more limited by the fluid flux (i.e, the transfer of motion to the oil via the water flow) than the thermal flux (i.e., the transfer of heat to the oil via steam). Increasing the fraction of oil carried by the water, then, produces more oil for same steam, and is thus highly desirable.

Two advantages of the method of the invention are that the use of an ammonium carboxylate can increase both the efficiency and the effectiveness with which heavy hydrocarbons are dispersed into (and thus carried by) water. Increased efficiency results in lower steam requirements, which results in lower energy costs. In some fields, heavy crude oil is recovered at a cost of ⅓ of the oil produced being used to generate steam. It would be desirable in the art to lower steam requirements thereby lowering the use of recovered hydrocarbons or purchased energy in the form of natural gas for producing heavy hydrocarbons. Increased effectiveness results in greater total recovery of bitumen from the formation. Less oil is left wasted in the ground. This increases the return for the fixed capital invested to produce it.

Typically, an additive for SAGD is volatile under the SAGD operating conditions so that it can travel with the steam to the edges of the steam chamber where it can interact with the bitumen. This volatility constraint limits the selection of additive to non-ionic chemicals, as ionic chemicals are usually solids and not volatile, and therefore would not be transported with the steam to the edge of the steam chamber.

The improvement in the present invention is the use of ammonium carboxylates where the free carboxylic acid is relatively volatile and the ammonia or the free amine is also relatively volatile. Ammonium carboxylates are thermally unstable and, on heating, will reversibly decompose to the free ammonia or amine and the free carboxylic acid. Not to be held by any particular theory, we believe that when injected into an injector well, the non-volatile ammonium carboxylate will decompose to form a volatile ammonia/amine and a volatile carboxylic acid which will be transported together to the edges of the steam chamber. Once at the edge of the steam chamber, the ammonia/amine and the carboxylic acid will reversibly recombine, hence reversibly forming an anionic surface active agent at the edge of the steam chamber. An advantage of an anionic surface active agent over typical non-ionic surface active agents is that they have a higher hydrophobic-lipophilic balance (HLB) which promotes formation of oil-in-water emulsions which are preferable over water-in-oil emulsions that tend to be formed by volatile non-ionic surface active agents. Some non-ionic surface active agents, such as glycol ethers, also tend to precipitate from solution at higher temperatures by reaching their cloud-point.

The ammonium carboxylate, once in salt form and dissolved in the condensed water at the steam chamber edge, can exchange with salts which are found naturally in groundwater, such as sodium chloride. The resultant sodium carboxylate will also act as a good surface active agent and aid the formation of oil-in-water emulsions.

In another embodiment of the process of the invention the ammonia or amine which is released from the ammonium carboxylate can interact with naphthenic acids in bitumen to form surface active agents.

The process of the present invention requires injecting a steam composition through a well into a subterranean location containing bitumen. The subterranean location is desirably in or proximate to an oil sand deposit. Oil sand is also known as tar sands or bituminous sands. Oil sand is loose sand, or partially consolidated sandstone containing mixtures of sand, clay and water, that includes bitumen. Canada, Kazakhstan and Russia all contain large quantities of oil sand deposits. The process of the present invention extracts bitumen from other components of the oil sands in a subterranean location by injecting a steam composition into the subterranean oil sand deposit to increase the flowability of the bitumen, thereby enabling the bitumen to drain from the oil sand components and eventually be recovered by pumping above ground. The process of the present invention avoids first having to remove oil sand from underground in order to extract bitumen from the removed oil sand as is required in a strip mining process. Instead, the present invention extracts bitumen from oil sands in situ, that is, in the subterranean location of the oil sand.

The steam composition of the present invention comprises both steam and an ammonium carboxylate. The composition is desirably injected at a temperature and pressure sufficient to provide a steam composition at a temperature of 150° C. or higher, preferably 180° C. or higher and at the same time desirably a temperature of 300° C. or lower, preferably 260° C. or lower.

The steam in the steam composition can be superheated steam, saturated steam, less than 100 percent quality steam or any combination thereof. "Superheated steam" is steam that is at a temperature above the vapor-liquid equilibrium point of water. "Saturated steam" is synonymous with 100 percent quality steam. The quality of steam is a characteristic of how much liquid water phase is present in the steam. 100 percent quality steam has zero percent liquid phase water present. "Less than 100 percent quality steam" has liquid water present. A steam composition that is less than 100 percent quality steam can include the resulting composition from feeding a steam feed and a liquid aqueous phase feed together (as is done, for example, in Examples 1-5 herein).

In the broadest scope of the present invention, the ammonium carboxylate is not limited in composition, preferably it is an ammonium carboxylate, a primary ammonium carboxylate, a secondary ammonium carboxylate, a tertiary ammonium carboxylate, or mixtures thereof. In general, the ammonium carboxylate has the following chemical formula:

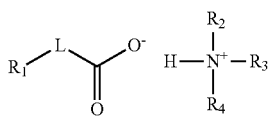

wherein L represents a methylene group, an alkyl ether group, preferably —CH$_2$CH$_2$CH$_2$O—, —CHMeCH$_2$O—, or —CH$_2$CHMeO—, an aryl group, an aryloxy group preferably —C$_6$H$_4$O—, an alkyl aryl group preferably —CH$_2$C$_6$H$_4$—, or alkyl aryloxy group preferably —CH$_2$C$_6$H$_4$O—, optionally the L group may be substituted with alkyl groups, branched alkyl groups, or heteroatom containing groups such as hydroxyl, acetoxy, alkyl ether, or halogen, R$_1$ is hydrogen or a linear or branched alkyl group having a primary chain length equal to or greater than 1 carbon and equal to or less than 15 carbons, preferably equal to or greater than 3 carbons and equal to or less than less than 15 carbons, and R$_2$, R$_3$, and R$_4$ are independently a hydrogen, a linear alkyl group, or a branched alkyl group, preferably a linear alkyl group having 1 to 12 carbons or a branched alkyl group having 3 to 12 carbons.

Preferred substituted methylene groups suitable for L are —CHMe-, —CMe$_2$-, —CHEt-, —CHPr—, or —CH(OH)—.

Preferred alkyl ether groups for L are ethyleneoxy or propyleneoxy, where the oxygen is attached directly to R$_1$.

Preferred aryl groups suitable for L are substituted or non-substituted phenylene groups.

Preferred aryloxy groups are —C$_6$H$_4$O— where the oxygen is attached directly to R$_1$.

Preferred alkylaryl groups are —CH$_2$C$_6$H$_4$—, or —CH$_2$CH$_2$C$_6$H$_4$— where the aryl group is attached directly to R$_1$.

Preferred alkylaryloxy groups are —CH$_2$C$_6$H$_4$O—, or —CH$_2$CH$_2$C$_6$H$_4$O— where the oxygen is attached directly to R$_1$.

Preferred linear alkyl group suitable for R$_1$ are methyl, ethyl, propyl, butyl, pentyl, hexyl, heptyl, octyl, nonyl, decyl, or undecyl.

Preferred branched alkyl group suitable for R$_1$ are —CHMe$_2$, —CHMeEt, —CH$_2$CHMe$_2$, or —CMe$_3$.

Preferred linear alkyl group suitable for R$_2$, R$_3$, and R$_4$ are methyl, ethyl, propyl, butyl, pentyl, hexyl, heptyl, octyl, nonyl, decyl, undecyl, or dodecyl.

Preferred branched alkyl group suitable for R$_2$, R$_3$, and R$_4$ are isopropyl, isobutyl, sec-butyl, tert-butyl, isopentyl, 2-methylbutyl, 1-ethylpropyl, or 1,2-dimethylpropyl.

Preferred ammonium ions are, but not limited to, ammonium (NH$_4$), methylammonium, dimethylammonium, trimethylammonium, ethylammonium, diethylammonium, triethylammonium, methylethylammonium, dimethylethylammonium, diethylmethylammonium, propylammonium, dipropylammonium, tripropylammonium, butylammonium, dibutylammonium, tributylammonium, pentylammonium, dipentylammonium, hexylammonium, dihexylammonium, heptylammonium, octylammonium, nonylammonium, decylammonium, undecylammonium, 1,1-dimethyl-2-hydroxy-ethylammonium, or dodecylammonium.

When an amine salt is used, the free amine should have a boiling point of equal to or less than 300° C., preferably equal to or less than 200° C., at ambient pressure.

Preferred carboxylates are derived from, but are not limited to, the following free acids: acetic acid, propionic acid, butanoic acid, 2-methylpropionic acid, pentanoic acid, 2-methylbutanoic acid, 3-methylbutanoic acid, 2,2-dimethylpropionic acid, hexanoic acid, 2-methylpentanoic acid, 3-methylpentanoic acid, 4-methylpentanoic acid, 3,3-dimethylbutanoic acid, heptanoic acid, 2-methyl hexanoic acid, octanoic acid, 2-ethylhexanoic acid, 2-methylheptanoic acid, 2-propylpentanoic acid, nonanoic acid, decanoic acid, undecanoic acid, dodecanoic acid, benzoic acid, phenylacetic acid, or methylbenzoic acid.

The primary chain length of the carboxylic acid (aliphatic chain with highest number of carbon atoms tailing away from carboxylate head-group) should be at least 1 carbon, preferably 3 carbons, more preferably 5 carbons. The primary chain length of the carboxylic acid (aliphatic chain with highest number of carbon atoms tailing away from carboxylate head-group) preferably is equal to or less than 12 carbons, more preferably equal to or less than 11 carbons, more preferably equal to or less than 10 carbons, and more preferably equal to or less than 9 carbons.

Preferably, the free carboxylic acid (i.e., in acid form) has a boiling point of equal to or less than 300° C., preferably equal to or less than 275° C., at ambient pressure.

Preferred carboxylate ions are, but not limited to, acetate, propionate, butanoate, 2-methylpropionate, pentanoate, 2-methylbutanoate, 3-methylbutanoate, 2,2-dimethylpropionate, hexanoate, 2-methylpentanoate, 3-methylpentanoate, 4-methylpentanoate, 3,3-dimethylbutanoate, heptanoate, 2-methyl hexanoate, octanoate, 2-ethylhexanoate, 2-methylheptanoate, 2-propylpentanoate, nonanoate, decanoate, undecanoate, dodecanoate, benzoate, phenylacetate, or methylbenzoate.

The steam composition can contain one ammonium carboxylate or a mixture of more than one kind of ammonium carboxylate.

The amount of ammonium carboxylate required in the steam composition to achieve improvement in bitumen extraction over steam alone is surprisingly low. The steam composition can contain as little as 0.005 weight percent (wt %) of ammonium carboxylate and still demonstrate an improvement in bitumen extraction over use to steam alone in the same process, preferably, the steam composition contains 0.05 wt % or more, more preferably 0.1 wt % or more, more preferably 0.2 wt % or more, more preferably 0.3 wt % or more, more preferably 0.4 wt % or more, or more preferably 0.5 wt % or more ammonium carboxylate. The steam composition can contain 25 wt % or less, preferably 20 wt % or less, more preferably 15 wt % or less, more preferably 10 wt % or less, more preferably 5 wt %, and more preferably 1 wt % or less ammonium carboxylate. Excessive amounts of ammonium carboxylate cause the cost of the process to increase so lower concentrations of the ammonium carboxylate are desirable from a cost standpoint. The wt % of ammonium carboxylate is based on total combined weight of steam and alkylene glycol ether.

Desirably, the steam composition is free of glycol ether amine. In general, the process of the present invention is desirably free of glycol ether amine as an extraction aid.

The steam composition can be free from hydrocarbons when injecting the steam composition into a subterranean location. The process of the present invention can be free of injecting hydrocarbons in any manner, whether in a steam composition or otherwise, into a well. Use of hydrocarbons is unnecessary in the present invention.

In its broadest scope, the present invention is independent from how to form the steam composition. For example, an aqueous solution of the ammonium carboxylate can be boiled to create the steam composition; ammonium carboxylate (neat or as an aqueous solution) can be introduced to steam, or any combination thereof.

After injecting the steam composition into a subterranean location containing heavy hydrocarbons, for example bitumen, the process further includes extracting the heavy hydrocarbon, i.e., bitumen, from the subterranean location to above the ground. The steam composition serves to cause the bitumen to become flowable allowing it to be pumped from underground to above ground. The process of the present invention can take the form of a cyclic steam stimulation (CSS) process where bitumen is pumped up the same well that the steam composition is injected, a steam assisted gravity drainage (SAGD) where bitumen is pumped up a second well (or production well) other than the well through which the steam composition is injected down a first well (or injection well) into the ground, or conceivable a combination of both CSS and SAGD type processes.

EXAMPLES

Oil-sands samples are obtained from Syncrude Canada Ltd. and contained between 11 to 12.6 percent oil. The initial oil content of each oil sands sample is measured before each experiment. Steam soaking experiments are done using a hanging mesh bucket 30 containing compressed oil sands in a Parr reactor 10 on a heating mantle 20, as shown in FIG. 1. The Parr reactor 10 has a width A and a height B. The hanging mesh bucket 30 is connected to a support 13 by a hook 14. The distance from the top of the hanging mesh basket 30 to the top of the Parr reactor 10 is C. All buckets used in these experiments are made with 841 micron mesh openings, a height D of 52 mm (2.05 inches), and diameter E of 35 mm (1.38 inches). The Parr reactor has one pressure gauge 12 and thermocouple 11 in the vapor space to monitor reactor conditions as well as a rupture disk connected to a knock-out pot. There is also a thermocouple in between the reactor and the heating mantle 21 to measure heating mantle surface temperature. A temperature controller (not shown in the drawing) is available to control the system temperature from either thermocouple (vapor or heating mantle surface).

Parr reactor vapor temperature, mantle temperature and vapor pressure are recorded during all experiments using a Siemens control system. A temperature controller controls the heating mantle using a vapor temperature set point of 188° C. For all campaigns, the Parr reactor is loaded with a stainless steel sleeve 15 that holds 150 mL of deionized (DI) water 16 with or without additives.

Oil sand batches are homogenized (removal of large rocks, mixing of sands) before being used in experiments to ensure consistency between experiments. The oil sands inside the hanging bucket are mechanically compressed using an Instron machine 5543 at 235 lbf for 30 minutes. Once the reactor and oil sands bucket is assembled and closed, the system is purged with nitrogen for a few minutes before beginning the heating procedure. Upon reaching 188° C. (warm-up time is about 1 hour), where a max pressure of 190 to 195 psig is reached, the reactor is heated for 3 more hours and subsequently allowed to cool down overnight. The steady state pressure is between 150 to 165 psig.

Preparing Solutions to Start the Experiment.

For the steam soaking experiments, water and additive are mixed and added to the stainless steel sleeve insert in the following amounts:
  water baseline trials: 150 mL of deionized (DI) water, no additive
  2.5 wt. % additive experiments: 150 mL of DI water with 3.75 g of additive Note that additive weight fractions are reported with respect to the mass of water present (rather than total solution mass).

Sample Collection Procedure.

After the reactor cools down, the heating mantle is lowered, and the Parr reactor is removed and unbolted. After the reactor is opened, the hanging bucket of oil sands is placed in an aluminum pan and put into an oven at 110° C. for 2 hours to dry out the water from the bucket. Then the dried bucket is placed into the desiccator for 30 min to cool to room temperature before being homogenized to eliminate any sand clumps. This sand is called the "spent sand sample" and analyzed for remaining oil content via toluene extraction (using 15 g of spent sand in 100 mL of toluene). The spent sand sample shows how much oil remains in the sand bed, and is used to calculate how much oil is extracted from the sand.

Sand Analysis Procedure.

Before analyzing the spent sand sample, it is placed in the hood for 1 hr to evaporate any trace water from the sample. Next, the sand sample is placed in a 110° C. oven for 2 hours to evaporate any additional water. Then the samples are cooled overnight in the desiccator. The dried sand is then homogenized. 100 mL toluene is added to 15 g of the prepared spent sand sample and the sample is placed in a shaker for 30 min at 400 rpm. Two vial aliquots (about 2 mL) of each oil/toluene sample are collected. Next, the mass of an empty aluminum pan is recorded. A pipette is used to transport the toluene/oil samples from both vials to an aluminum weigh pan. The pan is weighed immediately to obtain the weight of the initial samples (before too much toluene evaporates). The aluminum pans are then placed in the hood to allow the toluene to evaporate from the samples for at least 1 hour. After all of the visible liquid toluene has evaporated, the aluminum pans are placed in an 80° C. oven overnight. The dried samples are weighed to quantify the amount of oil in the spent sands which is used to calculate the amount of produced oil.

In the following Examples and Comparative Examples ammonium hydroxide is obtained as a 28 to 30% wt % solution in water from Sigma Aldrich, and is diluted to 0.66 wt % with water for the steam-soaking experiment.

Hexanoic acid, octanoic acid, and decanoic acid are obtained from Sigma Aldrich, and diluted to 2.5 wt % for the steam-soaking experiments.

Ammonium decanoate is obtained from ChemService and diluted to 2.5 wt % for the steam-soaking experiment.

Ammonium hexanoate and ammonium octanoate are synthesized as follows and are diluted to 1.75 wt % and 1.25 wt % in water respectively for the steam-soaking experiments.

Preparation of Ammonium Hexanoate.

To a 4 oz glass jar is added hexanoic acid (23.2 g, 0.200 mol), deionized water (3.3 g), and a stir bar. Ammonium hydroxide (11.5 g of 29.6%, 3.40 g ammonia, 0.2 mole ammonia) is added dropwise with vigorous stirring over several minutes, yielding a hot aqueous solution. The reaction mixture is stirred for one hour and allowed to cool. This yields an aqueous solution of 70% ammonium hexanoate in water.

Preparation of Ammonium Octanoate.

To a 4 oz glass jar is added octanoic acid (28.8 g, 0.200 mol), deionized water (24.1 g), and a stir bar. Ammonium hydroxide (11.5 g of 29.6%, 3.40 g ammonia, 0.2 mole ammonia) is added dropwise with vigorous stirring over several minutes. A thick viscous mass formed that required hand stirring with a spatula. The reaction mixture is then allowed to cool. This yields an aqueous mixture of 50% ammonium octanoate in water.

TABLE 1

| Example | Additive | Oil Recovery, % |
| --- | --- | --- |
| Comp Ex A | no additive | 11.7 |
| Comp Ex B | 0.66 wt % ammonium hydroxide | 19.3 |
| Comp Ex C | 2.5 wt % hexanoic acid | 7.6 |
| Comp Ex D | 2.5 wt % octanoic acid | 19.8 |
| Comp Ex E | 2.5 wt % decanoic acid | 33.6 |
| Example 1 | 1.75 wt % ammonium hexanoate | 15.8 |
| Example 2 | 1.25% wt % ammonium octanoate | 37.0 |
| Example 3 | 2.5 wt % ammonium decanoate | 57.6 |

The results show that the oil recovery obtained using the ammonium carboxylate salts is greater than the oil recovery obtained by the analogous free carboxylic acids, or ammonium hydroxide alone.

What is claimed is:

1. A process comprising:
   (a) injecting a steam composition into a subterranean location containing heavy hydrocarbons, the steam composition consisting of
      (i) steam
      and
      (ii) an ammonium carboxylate comprising an ammonium ion (i) and a carboxylate ion (ii) having the following chemical formula:

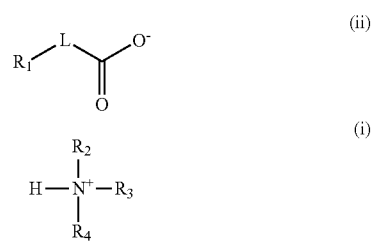

wherein L represents a methylene group, an alkyl ether group, an aryl group, an aryloxy group, an alkyl aryl group, or an alkyl aryloxy group, any of said groups optionally substituted with alkyl groups, branched alkyl groups, or heteroatom containing groups,
   $R_1$ is hydrogen or a linear or branched alkyl group having a primary chain length equal to or greater than 1 carbon and equal to or less than 15 carbons, and
   $R_2$, $R_3$, and $R_4$ are independently a hydrogen, a linear alkyl group, or a branched alkyl group
   and
   (b) recovering the heavy hydrocarbon from the subterranean location to above the ground.

2. The process of claim 1, further characterized by the ammonium carboxylate being present at a concentration of 0.005 weight percent or more and 25 weight percent or less based on combined ammonium carboxylate and steam weight.

3. The process of claim 1 wherein the ammonium carboxylate comprises one or more of the following ammonium ions (i) and one or more of the following carboxylate ions (ii):
   (i) ammonium ($NH_4^+$), methylammonium, dimethylammonium, trimethylammonium, ethylammonium, diethylammonium, triethylammonium, methylethylammonium, dimethylethylammonium, diethylmethylammonium, propylammonium, dipropylammonium, tripropylammonium, butylammonium, dibutylammonium, tributylammonium, pentylammonium, dipentylammonium, hexylammonium, dihexylammonium, heptylammonium, octylammonium, nonylammonium, decylammonium, undecylammonium, 1,1-dimethyl-2-hydroxy-ethylammonium, or dodecylammonium
   and
   (ii) acetate, propionate, butanoate, 2-methylpropionate, pentanoate, 2-methylbutanoate, 3-methylbutanoate, 2,2-dimethylpropionate, hexanoate, 2-methylpentanoate, 3-methylpentanoate, 4-methylpentanoate, 3,3-dimethylbutanoate, heptanoate, 2-methyl hexanoate, octanoate, 2-ethylhexanoate, 2-methylheptanoate, 2-propylpentanoate, nonanoate, decanoate, undecanoate, dodecanoate, benzoate, phenylacetate, or methylbenzoate.

4. The process of claim 1 wherein the carboxylate ion (ii) is a free carboxylic acid (i.e., in its acid form) has a boiling point of equal to or less than 300° C. at ambient pressure and the ammonium ion in the form of its free amine has a boiling point of equal to or less than 300° C. at ambient pressure.

5. The process of claim 1 wherein the process is cyclic steam stimulation (CSS) process wherein the steam composition is injected down a well into the subterranean location and the recovered heavy hydrocarbon is pumped up the well to above the ground.

6. The process of claim 1, wherein the process is a steam assisted gravity drainage (SAGD) process and the steam composition is injected into the ground through a first well and the heavy hydrocarbon that is displaced from the ground is recovered to above ground through a second well.

7. The process of any previous claim 1 wherein the heavy hydrocarbon is bitumen.

\* \* \* \* \*